Figure 1:
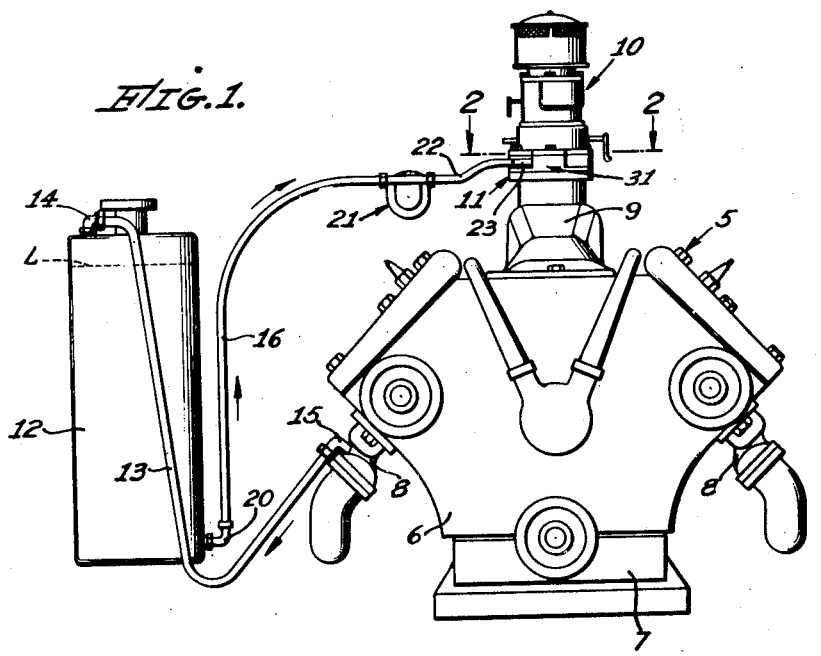

Jan. 10, 1950     S. W. GARRIGUS     2,493,808
WATER INJECTION SYSTEM FOR INTERNAL-COMBUSTION ENGINES
Filed Jan. 22, 1947

SAMUEL W. GARRIGUS,
Inventor
Attorney

Patented Jan. 10, 1950

2,493,808

UNITED STATES PATENT OFFICE 2,493,808

WATER INJECTION SYSTEM FOR INTERNAL-COMBUSTION ENGINES

Samuel W. Garrigus, Inglewood, Calif.

Application January 22, 1947, Serial No. 723,567

1 Claim. (Cl. 123—25)

The present invention relates to water injection systems for internal combustion engines, and has as its primary object the provision of a new and improved device for injecting water into the intake manifold at a rate substantially proportional to the power output of the engine so as to suppress detonation and give a cooler, smoother running engine.

Detonation is caused by an initial explosive combustion of the fuel charge in the cylinder which results when low octane gasoline is used in a high compression engine or when the spark is advanced too far, and its effect is to produce excessively high peak pressures and temperatures in the combustion chamber, with destructive shock loads on the pistons, connecting rods, bearings, and crankshaft. Even a relatively mild detonation causes excessive wear and overheating in the engine, while a severe detonation, if permitted to continue for any length of time, will cause a failure in the engine, putting it completely out of operation.

Detonation may be eliminated by using high octane gasoline, but such fuel is expensive and not always available. The average gasoline obtainable at most service stations is designed primarily for the majority of automobiles on the road, most of which are several years old, and while it is generally satisfactory for ordinary operation at average speeds and loads, it does not always prevent detonation at high speeds or when the engine is heavily overloaded. New cars, in particular, with their higher compression engines require premium fuels for ordinary operation and, even then, tend to detonate at high speeds or when overloaded.

In the present invention, detonation is effectively suppressed, even in high compression engines operating on relatively low octane fuel, by injecting finely atomized water into the fuel charge in the manifold. The tiny droplets of water suspended in the compressed charge in the cylinder are vaporized into steam almost instantaneously during the initial combustion period, and the latent heat of vaporization absorbed thereby prevents the development of the peak temperatures and corresponding shock pressures characteristic of detonation. As a result, the temperature and pressure gradients are leveled off to a substantially flat crest, giving a more uniform rate of flame propagation with improved engine efficiency.

One of the advantages obtained by injecting water into the intake manifold is that it permits the use of standard gasoline in an engine in which the compression ratio has been increased appreciably above normal, without having detonation occur and without requiring the use of a supercharger and valve overlap in order to cool the exhaust valves. Another advantage is that it permits the spark to be advanced from 5 to 8 degrees beyond the normal setting without producing detonation, while still a further advantage is that the formation of excessive deposits of carbon is prevented.

In prior water injection systems with which I am familiar, a jet is positioned in the intake airstream ahead of the gasoline carburetor, and water is drawn through the jet by the action of the air flowing past the open end thereof. Such systems require the use of a float chamber and an elevated reservoir tank to supply water thereto by gravity. The principal objection to this arrangement is that corrosion or the formation of scale sooner or later causes the float valve to stick. If the valve sticks in the open position, water flows by gravity into the intake manifold when the engine is stopped, and if the valve sticks in the closed position, the device becomes inoperative. Another disadvantage of this arrangement is that the presence of the water jet ahead of the gasoline carburetor jets causes the latter to tend to ice up quickly under certain temperature conditions. This is due to the fact that the tiny droplets of water impinging on the gasoline jets freeze into ice which builds up rapidly and soon closes the jets. Still a further disadvantage of having the water jet ahead of the carburetor is that the choke valve and butterfly valve shafts of the carburetor tend to rust quickly, with the result that the shafts either stick or cut the bearing surfaces and become loose.

It is another object of the present invention therefore, to provide a water injection system having no float valves or other moving parts which might be adversely affected by corrosion and scale formation, and in which the water tank is located below the level of the water jets, so that water cannot flow by gravity into the intake manifold when the engine is not running.

Another object of the invention is to provide a water injection system in which the jets are located downstream of the carburetor, thereby eliminating icing of the carburetor jets and rusting of the carburetor choke and butterfly valve shafts.

A further object is the provision of a device in which the rate of water injection is governed by the exhaust back pressure and is therefore almost instantaneously responsive to the engine's requirements, which are substantially proportional to the power output.

Still a further object of the invention is the provision of a water injection system which is simple and inexpensive to manufacture, and which is fully automatic in its operation.

The above objects are achieved in the present invention by means of an arrangement wherein the water jets are installed between the carburetor and intake manifold and are connected by a line to a water tank located slightly below the level of the jets. The tank is connected, in turn, by another line to the exhaust manifold of the engine, and back pressure of the exhaust is transmitted to the water tank, forcing water to flow through the line to the jets where it is injected into the intake manifold in the form of a finely atomized spray.

Figure 2:
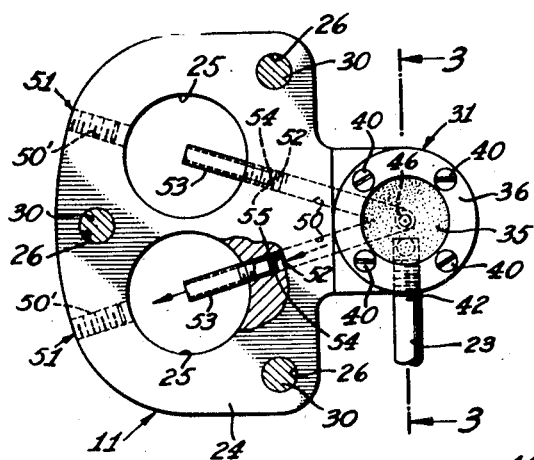
Figure 3:
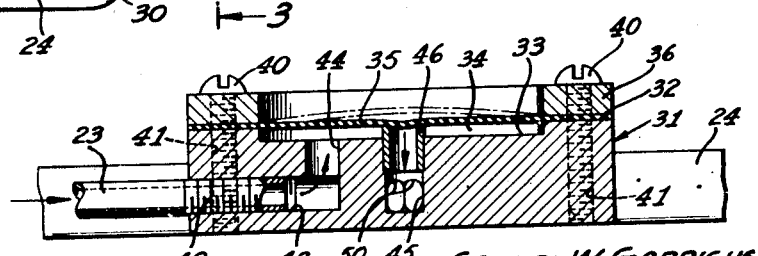

Other objects and advances of the invention will become apparent to those skilled in the art upon consideration of the following detailed description of the preferred embodiment thereof, reference being had to the accompanying drawings wherein Figure 1 is a schematic illustration of a typical installation of the water injection system on an automobile engine;

Figure 2 is an enlarged sectional view taken along the line 2—2 in Figure 1; and Figure 3 is an enlarged sectional view taken along the line 3—3 in Figure 2.

In Figure 1 of the drawings, the invention is shown as installed on a typical V-8 automotive engine, designated in its entirety at 5, and comprising a cylinder block 6 having a crankcase pan 7 bolted to the bottom edge thereof, and exhaust manifolds 8 which are bolted to the outer sides of the cylinder block in communication with the exhaust ports. An intake manifold 9 is mounted on the block 6 between the banks of cylinders, and mounted on top of the intake manifold is a carburetor 10.

The water injection system of the invention comprises an injector 11 which is installed between the intake manifold 9 and carburetor 10, and a water tank 12 which is mounted in any suitable manner so that the level L of the water contained therein is entirely below the level of the injector. A line 13, preferably of copper tubing of about ⅜ inch inside diameter is connected at one end by an elbow fitting 14 into the top of the tank 12 and at the other end by a fitting 15 to one of the exhaust manifolds 8 of the engine.

Another line 16, preferably of ¼ inch rubber hose, is secured by a suitable hose clamp to an elbow fitting 20 which is screwed into a tapped hole in the tank 12 near the bottom end thereof, and is connected at its other end to the intake of a filter 21. The outlet of the filter 21 is joined by a short line 22 of rubber hose to a nipple formed by a piece of tubing 23 projecting from one side of the injector 11.

The injector 11 is conveniently made in the form of a casting and includes a flat plate portion 24 disposed to lie between the mounting flanges of the intake manifold 9 and carburetor 10, and having two circular openings 25 provided therein which register with the internal passages of the carburetor and manifold. Where the carburetor and manifold have only one passage, as in the case of most in-line engines, the plate 24 would, of course, be provided with a single opening 25 to correspond therewith. Bolt holes 26 are drilled through the plate 24 to receive bolts 30 which secure the carburetor to the manifold.

Projecting laterally from one side of the plate 24 is an offset body portion 31 having a slightly elevated flat top surface 32 which is spot-faced to form a shallow circular recess 33. Resting on top of the surface 32 and covering the recess 33 to form a closed pocket 34 is a flexible diaphragm 35 of fabric reinforced neoprene or other rubber-like material. The diaphragm 35 is clamped tightly against the surface 32 by a retainer ring 36 which is secured by four screws 40, the latter being passed through aligned holes in the ring and diaphragm and threaded into tapped holes 41 in the body 31.

The piece of tubing 23 forming the nipple to which the hose 22 is joined, is provided with threads 42 and is screwed into a tapped hole 43 extending horizontally into the body 31 from one side thereof. The hole 43 intersects another hole 44 extending downwardly from the bottom of the recess 33 to one side of center, and thus provides a passage leading from the hose 22 to the pocket 34. Drilled down into the body 31 at the center of the recess 33 is a vertical hole 45, and pressed into the hole so that its top end is flush with the surface 32 is a short length of tubing 46 which forms a raised annular valve seat engageable by the diaphragm 35, the purpose of which will be explained presently.

Opening into the bottom of the hole 45 are two angularly disposed converging holes 50 which are drilled through from the far side of the plate 24 with their axes intersecting the centers of the openings 25. Each of the holes 50 includes an outer portion 50' which is necessary only for the purpose of drilling and tapping the inner portion, and since these outer portions 50' serve no useful function in the operation of the device, they are tapped to receive plug screws 51 which close them up. The end portions of the holes 50 adjacent the openings 25 are tapped at 52, and screwed into the threads thus formed are jet tubes 53 which project radially into the openings to the centers thereof. The threaded ends of the jet tubes 53 lying within the holes 50 are closed by plugs 54, preferably of hard solder, which are drilled through their centers to form metering holes 55. The metering holes 55 serve to restrict the flow of water through the jet tubes 53 and, when drilled to about .020 inch diameter, provide a water injection rate equal to approximately 10% of the gasoline consumption, which I have found from experience to be about the optimum condition. However, under extreme conditions where the fuel is abnormally low in octane rating or where the engine has been reworked to give an unusually high compression ratio, with the spark advanced to the maximum, it may be desirable to increase the rate of water injection, and this is accomplished by drilling the metering holes 55 to a larger size.

During operation of the invention, the back pressure in the exhaust manifold 8 is transmitted through line 13 to the tank 12 where it acts to force water out through lines 16 and 22 to the pocket 34 in the injector 11. Pressure of the water in the pocket is applied over substantially the entire area of the diaphragm 35 to lift the latter clear of the tubular valve seat 46, thereby permitting water to flow down through the central passage in the tube 46 and out through the jet tubes 50 where it is injected into the airstream inducted into the intake manifold.

When the engine is idling and delivering a low power output, water injection is unnecessary, and the flow to the jet tubes is cut off by the diaphragm 35 which closes on the valve seat 46. This cut-off action of the diaphragm results from the fact that when the engine is operating under light load, as while idling or when the automobile is traveling down grade, the back pressure in the exhaust manifold 8 becomes negligible, while the vacuum in the intake manifold 9 is relatively high. Since the jet tubes 53 are in communication with the intake manifold, the pressure prevailing in the central passage of the tubular valve seat 46 is the same as that obtained in the intake manifold, and as a result the diaphragm is held down on the valve seat by the intake suction. As the throttle of the engine is opened, the intake manifold pressure rises, reducing the pressure differential acting on the area of the diaphragm covering the valve seat 46, and at the same time the exhaust back pressure increases, causing the water in the pocket 34 to exert an increased pressure against the much larger area of the diaphragm surrounding the valve seat. The increased water pressure, acting on the relatively large area of the diaphragm is then sufficient to overcome the reduced intake suction acting on the small diaphragm area covering the valve seat 46 so that the diaphragm is lifted clear of the seat, admitting water to the jet tubes for injection into the intake manifold. Tests have shown that the injection of water begins almost immediately when accelerating in low gear, and at about fifteen miles per hour when traveling on level ground in high gear.

Since the water in the tank 12 is discharged through the lines 16 and 22 to the injector 11 by exhaust back pressure which is substantially directly proportional to the power output of the engine the rate of water injection is likewise substantially directly proportional to the power output. The absence of float valves or other moving parts in the present system eliminates the difficulties due to corrosion and scale formation experienced with prior water injection systems, and the location of the injector 11 between the carburetor 10 and intake manifold 9 eliminates icing and corrosion of the carburetor.

While I have shown and described in detail what I consider to be the preferred embodiment of my invention, it is to be understood that such details are merely illustrative, and various changes may be made in the shape and arrangement of the several parts without departing from the broad scope of the claim appended hereto.

I claim:

A water injection system for use with an internal combustion engine comprising, in combination, an injector body mounted between the carburetor and the intake manifold of the engine and having a throat opening in registration with the passages in said carburetor and said manifold, an extension projecting laterally from one side of said injector body, said extension having a shallow circular recess formed in the top surface thereof, a thin sheet rubber diaphragm covering said recess and cooperating therewith a form a pocket, a ring secured to said extension and clamping tightly against the marginal edge of said diaphragm, a centrally disposed hole formed in the bottom of said recess, a tubular seat secured within said hole and projecting upwardly from the bottom of said recess, the top end of said tubular seat being disposed in the plane of the top surface of said extension so that said diaphragm bears lightly thereon when the engine is at rest, a jet tube communicating with said pocket and extending into said throat opening in said injector body, a water tank located so that the level of the water contained therein is entirely below the level of said jet tube, a line connected with said tank to receive water from the lower end thereof, said line opening into said pocket, another line connected to the exhaust manifold of the engine and to said tank above the water level, whereby back pressure in the exhaust manifold is transmitted to said tank to force water through said first-named line to said pocket, the pressure of the water in said pocket tending to lift said diaphragm from said seat against the suction in said tubular seat except when the engine is delivering a low power output, so as to admit water to said jet tube, and a metering orifice in said jet tube for restricting the flow of water to a predetermined maximum flow when said engine is operating at high power output.

SAMUEL W. GARRIGUS.

REFERENCES CITED

The following references are of record in the file of this patent:

UNITED STATES PATENTS

| Number | Name | Date |
| --- | --- | --- |
| 1,193,084 | Thomas | Aug. 1, 1916 |
| 1,338,993 | McNeel | May 4, 1920 |
| 1,626,798 | Fay | May 3, 1927 |
| 2,375,883 | Anderson | May 15, 1945 |